(12) United States Patent
Akselrod et al.

(10) Patent No.: US 9,329,277 B2
(45) Date of Patent: May 3, 2016

(54) OSL SENSOR HAVING A REFLECTIVE BACKING

(71) Applicants: Mark S. Akselrod, Stillwater, OK (US); R. Craig Yoder, Crown Point, IN (US)

(72) Inventors: Mark S. Akselrod, Stillwater, OK (US); R. Craig Yoder, Crown Point, IN (US)

(73) Assignee: Landauer, Inc., Glenwood, IL (US)

( * ) Notice: Subject to any disclaimer, the term of this patent is extended or adjusted under 35 U.S.C. 154(b) by 0 days.

(21) Appl. No.: 13/923,489

(22) Filed: Jun. 21, 2013

(65) Prior Publication Data

US 2013/0341530 A1 Dec. 26, 2013

Related U.S. Application Data

(60) Provisional application No. 61/663,223, filed on Jun. 22, 2012, provisional application No. 61/663,241, filed on Jun. 22, 2012.

(51) Int. Cl.
*G01T 1/10* (2006.01)

(52) U.S. Cl.
CPC ........................................ *G01T 1/10* (2013.01)

(58) Field of Classification Search
CPC .................................. G01T 3/00; G01T 1/10
USPC ....................................................... 250/484.5
See application file for complete search history.

(56) References Cited

U.S. PATENT DOCUMENTS

| | | | |
|---|---|---|---|
| 5,049,754 A * | 9/1991 | Hoelscher et al. ......... | 250/484.3 |
| 5,083,031 A * | 1/1992 | Hoelsher et al. ........... | 250/484.3 |
| 5,114,661 A | 5/1992 | Prelas | |
| 5,132,543 A | 7/1992 | Valentine et al. | |
| 5,731,590 A | 3/1998 | Miller | |
| 5,962,857 A | 10/1999 | McKeever et al. | |
| 5,962,962 A | 10/1999 | Fujita et al. | |
| 6,087,666 A * | 7/2000 | Huston et al. .............. | 250/484.5 |
| 6,127,685 A | 10/2000 | Yoder et al. | |
| 6,198,108 B1 | 3/2001 | Schweitzer et al. | |
| 6,846,434 B2 | 1/2005 | Akselrod | |
| 7,098,470 B2 | 8/2006 | Akselrod et al. | |
| 7,141,804 B1 | 11/2006 | Akselrod et al. | |
| 7,157,681 B1 | 1/2007 | Tetzlaff | |
| 7,420,187 B1 | 9/2008 | Klemic et al. | |
| 8,115,182 B1 | 2/2012 | Patel | |
| 8,373,142 B2 | 2/2013 | Yoder et al. | |
| 2009/0224176 A1 | 9/2009 | Patel | |
| 2011/0168919 A1* | 7/2011 | Yoder et al. ................ | 250/483.1 |

FOREIGN PATENT DOCUMENTS

| | | |
|---|---|---|
| JP | 2007-47132 A | 2/2007 |
| JP | 2007205766 A | 8/2007 |

(Continued)

OTHER PUBLICATIONS

Botter-Jensen, L., et al., "Optically Stimulated Luminescence Dosimetry," Elsevier, 2003.

(Continued)

*Primary Examiner* — Marcus Taningco
(74) *Attorney, Agent, or Firm* — Alchemy-Partners, PC

(57) ABSTRACT

An optically stimulated luminescence (OSL) sensor is provided that has a reflective backing for improving the efficiency of exposing an optically stimulated luminescence material (OSLM) of the OSL sensor to stimulation light and for increasing the efficiency of detecting luminescent light emitted by the OSLM.

21 Claims, 6 Drawing Sheets

(56) References Cited

FOREIGN PATENT DOCUMENTS

| KR | 100529181 B1 | 11/2005 |
|---|---|---|
| WO | 2011/086495 A2 | 7/2011 |
| WO | 2011086492 A2 | 7/2011 |
| WO | 2011125053 A2 | 10/2011 |
| WO | 2012036570 A1 | 3/2012 |

OTHER PUBLICATIONS

Klemic, G., et al., "External Dosimetry in the Aftermath of a Radiological Terrorist Event," Radiation Protection Dosimetry, vol. 120, No. 1-4, pp. 242-249, 2006.

Akselrod, M.S., et al., "Preparation and Properties of Al2O3:C," Radiation Protection Dosimetry, vol. 47, No. 1-4, pp. 159-164, 1993.

Akselrod, M.S., et al., "Optically Stimulated Luminescence of Al2O3," Radiation Measurements, vol. 29, No. 3-4, pp. 391-399, 1998.

International Search Report and Written Opinion mailed Feb. 14, 2014 in corresponding International Application No. PCT/IB2013/055120.

International Search Report and Written Opinion mailed Feb. 18, 2014 in corresponding International Application No. PCT/IB2013/055115.

Notification Concerning Transmittal of International Preliminary Report on Patentability (Chapter I of the Patent Cooperation Treaty) received in PCT Application No. PCT/IB2013/055120 mailed Dec. 31, 2014.

Final Office Action received in related U.S. Appl. No. 13/921,345, mailed Feb. 5, 2015.

Communication received in European Application No. 15154231.3 mailed Sep. 4, 2015.

J.L. Genicot et al., "Description of a portable devices devloped at SCK.GEN for OSA and TL dosimetry", Radiation Measurements, vol. 46, pp. 1578-1581 (2011).

Kulkarni et al., "A versatile integrated system for thermoluminescence and optically stimulated luminescence measurements", Nuclear Instruments and Methods in Physics Research Section B: Beam Interactions with Materials and Atoms, vol. 262, Issue 2, pp. 348-356 (Sep. 2007).

Office Action received in U.S. Appl. No. 13/921,345 mailed Oct. 21, 2015.

Office Action received in related U.S. Appl. No. 13/921,345, mailed May 15, 2015 to Akselrod.

Office Action received in Japanese Patent Application No. 2015-517917 dated Jun. 9, 2015.

* cited by examiner

OSL SENSOR HAVING A REFLECTIVE BACKING

CROSS-REFERENCE TO RELATED APPLICATIONS

This application claims benefit of priority to U.S. Provisional Patent Application No. 61/663,223 to Akselrod et al., entitled "NOVEL OPTICAL SYSTEM FOR PORTABLE OSL READER", filed Jun. 22, 2012, and U.S. Provisional Patent Application No. 61/663,241 to Dillin et al., filed Jun. 22, 2012, entitled "METHOD AND APPARATUS FOR FAST DETERMINATION OF UNKNOWN RADIATION DOSE", the entire contents and disclosures of which are incorporated herein by reference.

BACKGROUND

1. Field of the Invention

The present invention relates to optically stimulated luminescence (OSL) sensor.

2. Related Art

It is a challenge to make an OSL sensor that has high efficiency with respect to the optically stimulated luminescence material (OSLM) of the OSL sensor absorbing the stimulation light from an OSL reader and with respect to the OSL reader collecting luminescent light emitted by the OSLM of the OSL sensor.

SUMMARY

According to a first broad aspect, the present invention provides a device comprising: a dosimeter sled comprising one or more optically stimulated luminescence (OSL) sensors, each OSL sensor comprising: an optically stimulated luminescent material (OSLM) mounted in a recess of the dosimeter sled, and a reflective backing positioned in the recess, wherein the recess is a cylindrical cup-shaped recess having a base, and wherein the reflective backing is positioned between the OSLM and the base of the recess.

According to a second broad aspect, the present invention provides a device comprising: a dosimeter sled comprising one or more optically stimulated luminescence (OSL) sensors, each OSL sensor comprising: an optically stimulated luminescent material (OSLM) mounted in a recess of the dosimeter sled, and a reflective backing mounted in the dosimeter sled, wherein the recess is a cylindrical cup-shaped recess having a base, wherein the base of the recess comprises a portion of a surface of the reflective backing, wherein the reflective backing has a larger surface area than the base of the recess, and wherein the OSLM is disc-shaped.

According to a third broad aspect, the present invention provides a device comprising: a dosimeter sled comprising: a reflective backing, one or more optically stimulated luminescence (OSL) sensors, each OSL sensor comprising: an optically stimulated luminescent material (OSLM) mounted in a recess of the dosimeter sled, and the reflective backing, wherein the recess is a cylindrical cup-shaped recess having a base, wherein the base of the recess of each OSL sensor comprises a portion of the reflective backing, and wherein the OSLM of each OSL sensor is disc-shaped.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

DETAILED DESCRIPTION OF THE PREFERRED EMBODIMENTS

Definitions

Figure 1:
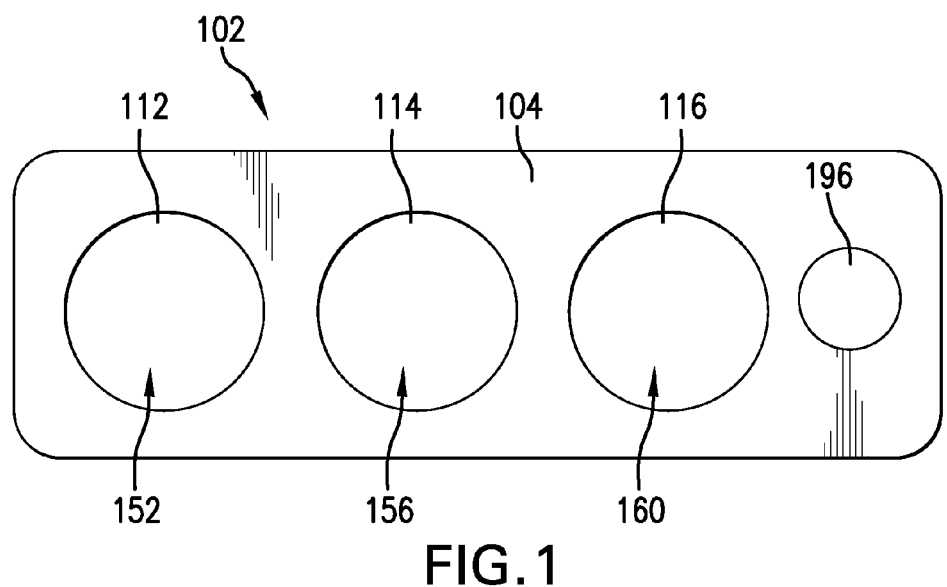
FIG. 1 is a schematic plan view of a dosimeter sled of the present invention having three OSL sensors.

Where the definition of terms departs from the commonly used meaning of the term, applicant intends to utilize the definitions provided below, unless specifically indicated.

For purposes of the present invention, directional terms such as "top", "bottom", "upper", "lower", "above", "below", "left", "right", "horizontal", "vertical", "upward", "downward", etc., are merely used for convenience in describing the various embodiments of the present invention.

For purposes of the present invention, a value or property is "based" on a particular value, property, the satisfaction of a condition, or other factor, if that value is derived by performing a mathematical calculation or logical decision using that value, property or other factor.

For purposes of the present invention, the term "$Al_2O_3$ material" refers to a material that is mainly comprised of $Al_2O_3$. An example of an $Al_2O_3$ material is $Al_2O_3$:C ($Al_2O_3$ doped with carbon).

For the purposes of the present invention, the term "angle of incidence" refers to the angle between the direction of the radiation trajectory and a line perpendicular (normal) to the detector surface.

For the purposes of the present invention, the term "close proximity" refers to a distance comparable with the penetration range of charged particles in a particular medium.

For the purposes of the present invention, the term "comparator OSL sensor" refers an OSL sensor that includes a reference filter made of a reference filter material and is used to adjust the dose determined by the reference sensor at very low energies of x-rays or gamma rays. In some embodiments of the present invention, the reference filter of a comparator OSL sensor may a thin coating of a reference filter material applied on an OSLM or be mounted as a thin film or disc adjacent to the OSLM in a reference OSL sensor. In one embodiment of the present invention, the reference filter may be in the form of a disc that is mounted between the OSLM and the base of a disc-shaped filter that are all mounted in cylindrical cup-shaped recess of a dosimeter sled. In one embodiment of the present invention, the OSLM of a comparator OSL sensor may be mixed with the reference filter material of the reference filter so that the OSLM is embedded or suspended in the reference filter material.

For purposes of the present invention, the term "computer" refers to any type of computer or other device that implements software including an individual computer such as a personal computer, laptop computer, tablet computer, mainframe computer, mini-computer, etc. A computer also refers to electronic devices such as a smartphone, an eBook reader, a cell phone, a television, a handheld electronic game console, a videogame console, a compressed audio or video player such as an MP3 player, a Blu-ray player, a DVD player, etc. In addition, the term "computer" refers to any type of network of computers, such as a network of computers in a business, a computer bank, the Cloud, the Internet, etc.

For the purposes of the present invention, the term "converter material" refers to a converter material that is used in contact with an OSL sensor. For example converter material can convert non-ionizing neutron radiation into recoil or knockout protons, which can be detected by an OSL sensor. An example of a "converter material" is high-density polyethylene (HDPE). Another example of a "converter material" that does not contain hydrogen and can be used as a reference converter material is Polytetrafluoroethylene (PTFE). In some embodiments of the present invention, a converter material may be applied as a thin coating on an OSLM or be mounted as a thin film or disc adjacent to the OSLM of a neutron-sensitive OSLM sensor. In one embodiment of the present invention, the converter material may be in the form of a disc that is mounted between the OSLM and a disc-shaped filter that are all mounted in a cylindrical cup-shaped recess of a dosimeter sled. In one embodiment of the present invention, the body of a dosimeter sled made of a converter material such as HDPE or PE so that the entire dosimeter sled may act as converter material for an OSLM mounted in the dosimeter sled. In another embodiment of the present invention, the OSLM may be mixed with the converter material so that the OSLM is embedded or suspended in the converter material.

For purposes of the present invention, the term "cylindrical cup-shaped" refers to a recess having the general shape of a right cylinder with the top or bottom of the cylinder removed i.e. the recess has a disc-shaped bottom or top and a cylindrical wall extending therefrom. The walls, top or bottom may be formed from the same material or different materials depending on the angular and energy compensation response to radiation desired for the dosimeter. There may be an opening in the bottom of the cylindrical cup-shaped recess.

For the purposes of the present invention, the term "energy compensating material" refers to a material that when placed between an OSLM and a source of gamma radiation or x-ray radiation alters the response over a range of gamma energies or x-ray energies compared to the OSLM exposed with no compensating or filtering material. Examples of energy compensating materials are copper and aluminum.

For purposes of the present invention, the term "filter" refers to any structure that is located between a radiation sensing material, such as an OSLM, and a source of radiation and affects the radiation experienced by the radiation sensing material. For example, a filter may be an energy compensating filter, a converter, a reference filter, a conformal disc etc. In one embodiment of the present invention, the energy compensating filter may be a disc-shaped filter. A filter comprises one or more filter materials.

For purposes of the present invention, the term "filter material" refers the material or materials of which a filter is comprised. For example, depending on the type of filter, a filter material may be an energy compensating material, a converter material, a reference filter material, a conformal material, etc.

For purposes of the present invention, the term "heavy charged particle (HCP)" refers to nuclei or ions with masses equal to or greater than a proton. Some representative, but nonlimiting examples of heavy charged particles include: alpha particles, tritium ions, protons, recoil protons, etc.

For purposes of the present invention, the term "indirectly ionizing radiation" refers to x-rays, gamma rays or neutrons.

For purposes of the present invention, the term "ionizing radiation" refers to any particulate or electromagnetic radiation that is capable of dissociating molecules into a positively and negatively charged ion pair or remove electrons from atoms in gas, liquid or solid matter. In one embodiment, an OSL reader of the present invention may be used to determine doses of ionizing radiation.

For purposes of the present invention, the term "irradiation" refers to the conventional meaning of the term "irradiation", i.e., exposure to high energy charged particles, e.g., electrons, protons, alpha particles, etc., or electromagnetic radiation of wave-lengths shorter than those of visible light, e.g., gamma rays, x-rays, ultraviolet, etc., or neutrons.

For purposes of the present invention, the term "low penetrating radiation" refers to radiation from heavy charged particles having penetration range that is less than 100 microns (100µ) in a radiation sensing material or absorber. Examples of low penetrating radiation are: alpha particles, recoil protons, etc.

For purposes of the present invention, the term "moderated neutrons" refers to neutrons produced by slowing fast neutrons by a hydrogen, deuterium, carbon or other light atoms containing moderator and having a large contribution of low energy neutrons in the energy range from about 0.025 eV to about 10 keV.

For purposes of the present invention, the term "neutron to proton converter" refers to a hydrogen-containing material, such as high-density polyethylene (HDPE) that may be used to convert non-ionizing neutron radiation into recoil or knockout protons, which can be detected by a radiation sensor.

For purposes of the present invention, the term "neutron-sensitive OSL sensor" refers to an OSL sensor that detects neutrons. A neutron-sensitive OSL sensor may also detect other types of radiation such as x-ray and gamma rays.

For purposes of the present invention, the term "OSLM" refers to an OSL material, i.e., a material whose exposure to radiation (directly, indirectly or low-penetrating) may be determined using optically stimulated luminescence techniques. An $Al_2O_3$ material, such as an $Al_2O_3$:C, is an example of an OSLM. The amount of radiation exposure that an $Al_2O_3$ material has received may be measured by stimulating the $Al_2O_3$ material with green light from either a laser or light emitting diode source. The resulting blue light emitted from the $Al_2O_3$ is proportional to the amount of radiation exposure and the intensity of stimulation light. Both high and low-energy photons and beta particles can be measured with this technique. For more information on OSL materials and systems, see, U.S. Pat. No. 5,731,590 issued to Miller; U.S. Pat. No. 6,846,434 issued to Akselrod; U.S. Pat. No. 6,198,108 issued to Schweitzer et al.; U.S. Pat. No. 6,127,685 issued to Yoder et al.; U.S. patent application Ser. No. 10/768,094 filed by Akselrod et al.; all of which are incorporated herein by reference in their entireties. See also Optically Stimulated Luminescence Dosimetry, Lars Botter-Jensen et al., Elesevier (2003); Klemic, G., Bailey, P., Miller, K., Monetti, M. External radiation dosimetry in the aftermath of radiological terrorist event, Rad. Prot. Dosim., 120 (1-4): 242-249 (2006); Akselrod, M. S., Kortov, V. S., and Gorelova, E. A., Preparation and properties of $Al_2O_3$:C, Radiat. Prot. Dosim. 47, 159-164 (1993); and Akselrod, M. S., Lucas, A. C., Polf, J. C., McKeever, S. W. S. Optically stimulated luminescence of $Al_2O_3$:C, Radiation Measurements, 29, (3-4), 391-399 (1998), all of which are incorporated herein by reference in their entireties.

For purposes of the present invention, the term "OSL reader" refers to a device that produces stimulation light that stimulates an OSLM in an OSL sensor to emit luminescent light. Under a specified stimulation regime (continuous stimulation, reading wavelength and intensity, and pulsed stimulation with various pulse durations, pulse frequency, pulse shape and time between pulses) the intensity of the emitted light is proportional to the radiation exposure in a range from about 0.01 mGy (1 mrad) to over about 100 Gy (10,000 rads).

For purposes of the present invention, the term "OSL sensor" refers to a radiation sensor that is made from or includes an OSLM. OSL sensors may be read using an OSL reader. One or more OSL sensors may be part of a radiation dosimeter and/or a dosimeter sled. Examples of radiation dosimeters and dosimeter sleds including OSL sensors are described and shown in U.S. Pat. No. 8,373,142 to Yoder et al., entitled, "DOSIMETER SLED," issued Feb. 12, 2013, the entire contents and disclosure of which are incorporated herein by reference.

For purposes of the present invention, the term "penetrating photon radiation" refers to short wavelength electromagnetic radiation with energies equal to or higher than 10 keV as might originate from radioactive nuclear decay, from space or produced by accelerating or decelerating of charge particles, for example, in an X-ray machine or in an accelerator.

For purposes of the present invention, the term "penetrating beta radiation" refers to electrons with energies equal to or greater than 10 keV as might originate from radioactive nuclear decay, from space, produced by radiation-induced ionization of atoms or by acceleration in an electric field.

For purposes of the present invention, the term "portion" refers to any portion of an object or material, including the entire object and material. For example, a converter that covers a "portion" of a luminescent material may cover part or all of one or more surfaces of the luminescent material.

For purposes of the present invention, the term "pulsed optically stimulated luminescence" refers to a technique of reading an OSL sensor by stimulating the OSL material in the OSL sensor using a continuous stream of short (i.e. less than the prompt luminescence lifetime) pulses of light, such as laser light or LED light, measuring the emitted light from the OSL sensor only during the time between LED pulses within the stream, with a certain delay after each stimulation LED pulse. Pulsed, optically simulated luminescent (POSL) techniques may be used in reading OSL sensor having OSL material with a relatively long luminescence decay time (i.e. tens of microseconds to tens of milliseconds). An important element in POSL is the choice of a laser or LED pulse width which is significantly shorter than the decay time of the OSL emission from the OSL material.

For purposes of the present invention, the term "radiation dose" refers to the value of the radiation dose for a particular type of radiation to which an OSL sensor has been exposed.

For purposes of the present invention, the term "radiation dosimetry" refers to the conventional meaning of the term "radiation dosimetry", i.e., the measurement of the amount of absorbed radiation dose received in a material, an object or the body of an individual.

For purposes of the present invention, the term "radiation sensing material" refers to a material used to sense radiation in a radiation sensor. Examples of radiation sensitive materials including optically stimulated luminescent materials for OSL sensors, thermoluminescent materials for thermoluminescent dosimetry (TLD) sensors, etc.

For purposes of the present invention, the term "reading position" refers to an OSL sensor that is in a position relative to the optical engine of the OSL reader that allows the OSL sensor to be read by the OSL reader For purposes of the present invention, the term "recoil protons" refers to those protons that are generated by the collision of neutrons with a converter containing a source of hydrogen atoms, e.g. polyethylene or high-density polyethylene.

For purposes of the present invention, the term "reference filter" refers to a filter comprising a reference filter material.

For the purposes of the present invention, the term "reference filter material" refers to a non-hydrogen containing, carbon based material with certain optical absorption and reflection properties that has a filtering effect on x-rays and gamma rays that is similar to the radiation filtering and optical absorption and reflection effects of an organic converter material on x-rays and gamma rays. For example, the "reference filter material" fluorinated plastic polytetrafluoroethylene (sold under the trade name Teflon® by DuPont), which has a filtering effect on x-rays and gamma rays that is similar to the neutron-to-proton converter material high-density polyethylene (HDPE). A reference filter material acts on both optical stimulation and luminescence light and is used to enhance the effectiveness of the reading of an OSL sensor.

For the purposes of the present invention, the term "reference OSL sensor" is an OSL sensor that includes a reference filter and is used to determine the effects of a converter material on x-ray and gamma ray detection by another OSL sensor that is identical to the reference OSL sensor, except for the substitution of the converter material for the reference filter. In some embodiments of the present invention, the reference filter material of the reference filter of a reference OSL sensor may be applied as a thin coating on an OSLM or be mounted as a thin film or disc adjacent to the OSLM in a reference OSL sensor. In one embodiment of the present invention, the reference filter may be in the form of a disc that is mounted between the OSLM and disc-shaped filter that are all mounted in a cylindrical cup-shaped recess of a dosimeter sled. For many radiation dosimeters, which employ three OSL sensors arranged in a row, the best angular response for the radiation dosimeter is often improved when the reference OSL sensor is the center OSL sensor. In one embodiment of the present invention, the OSLM of the reference OSL sensor may be mixed with the reference filter material of the reference filter so that the OSLM is embedded or suspended in the reference filter material.

For purposes of the present invention, the term "reflective backing" refers to a piece of reflective material or a reflective coating that reflects back stimulation light from an OSL reader that passes through an OSLM and/or that reflects back towards an OSL reader fluorescent light that is emitted by the OSLM. For example, a metal filter disc of an OSL sensor may act as a reflective backing that improves the efficiency of the exposure of the OSLM to stimulation light and that improves the efficiency of the detection of luminescent light emitted by the OSLM. Also, a reflective coating coated on the base of a recess in which an OSLM is mounted may function as a reflective backing. In addition a reflective coating coated on a filter mounted in the recess in which an OSLM is mounted may function as a reflective backing. In some embodiments of the present invention, the reflective backing may have a shape other than a disc. For example, a reflective backing may be square, rectangular, oval, lozenge-shaped, etc. There may be a separate reflective backing for each OSL sensor or the reflective backing may be a filter that is shared by several OSL sensors of a dosimeter sled. In some embodiments of the present invention, the reflective backing may be an aluminized coating on the base of a recess in which an OSLM is mounted or an aluminized coating on a filter.

For purposes of the present invention, the term "slidably mounted" refers to a component that has been mounted in the device by sliding the component into or on the device. For example, a dosimeter sled having one or more OSL sensors may be slid into and out of a recess of a radiation dosimeter in which the dosimeter sled is mounted such as described and shown in U.S. Pat. No. 8,373,142 to Yoder et al., entitled, "DOSIMETER SLED," issued Feb. 12, 2013, the entire contents and disclosure of which are incorporated herein by reference.

Description

For more information on OSL materials and systems, see, U.S. Pat. No. 5,731,590 issued to Miller; U.S. Pat. No. 6,846,434 issued to Akselrod; U.S. Pat. No. 6,198,108 issued to Schweitzer et al.; U.S. Pat. No. 6,127,685 issued to Yoder et al.; U.S. patent application Ser. No. 10/768,094 filed by Akselrod et al.; all of which are incorporated herein by reference in their entireties. See also Optically Stimulated Luminescence Dosimetry, Lars Botter-Jensen et al., Elesevier, 2003; Klemic, G., Bailey, P., Miller, K., Monetti, M. External radiation dosimetry in the aftermath of radiological terrorist event, Rad. Prot. Dosim., in press; Akselrod, M. S., Kortov, V. S., and Gorelova, E. A., Preparation and properties of $Al_2O_3$: C, Radiat. Prot. Dosim. 47, 159-164 (1993); and Akselrod, M. S., Lucas, A. C., Polf, J. C., McKeever, S. W. S. Optically stimulated luminescence of $Al_2O_3$:C, Radiation Measurements, 29, (3-4), 391-399 (1998), all of which are incorporated herein by reference in their entireties.

In one embodiment, the present invention allows OSL sensors to be permanently embedded in a sled so that the sensor(s) can be carried by the sled to the stimulation light source and luminescence collector without having to separate the OSL sensors from the sled. This aids chain of custody because the singularity of the dosimeter sled and OSL sensors allows the same identification label or tag to apply to all parts. Also, because the sled also contains the filters, the positional arrangement of all the important elements of the dosimeter are fixed and not disassembled for analysis.

One of the most difficult tasks in radiation dosimetry is discrimination of the dose created by different radiations, especially neutrons. Accordingly, the neutrons need to be converted to directly ionizing radiation, such as alpha particles, energetic protons, etc., to be detected by such crystals. For dosimetry of fast neutrons, recoil protons from hydrogen rich plastics, such as high-density polyethylene, are preferred because they are similar to the interactions with water that occur in the body. These converters of neutrons may be associated with, attached to or otherwise in contact with the luminescent material, may be mixed or merged with the luminescent material or may be even be part of or incorporated into the luminescent material. Alpha and beta particles and protons originated from radionuclides and accelerator facilities, as well as heavy charged particles of cosmic rays, usually do not need any conversion.

In one embodiment of the present invention, each OSL sensor comprises an assembly composed of one or more discs that act as energy compensating filters that alter the energy or gamma rays and x-rays able to reach the OSL material (OSLM). In one embodiment of the present invention, one of the filter discs acts as a reflective backing that improves the efficiency of the exposure of the OSLM to stimulation light and that improves the efficiency of the detection of luminescent light emitted by the OSLM. In other embodiments of the present invention, the reflective backing may have a shape other than a disc. In yet other embodiments of the present invention, the reflective backing may be a filter that is shared by several OSL sensors of a dosimeter sled.

In one embodiment of a neutron-sensitive OSL sensor of the present invention, the thickness of the HDPE converter that converts the neutrons into recoil protons and the gamma rays/x-rays into electrons is optimized at 1 mm to create a maximum number of recoil protons and electrons. A separate thin piece of HDPE may be added to provide better contact between the OSLM and HDPE.

In one embodiment of the present invention, the thickness of the PTFE used in the reference OSL sensor and the comparator OSL sensor is such that it converts the gamma rays/x-rays into a similar number of electrons. In this case its thickness is also 1 mm. The tolerance of the thicknesses of both converters may be ±0.1 mm.

The OSLM, converters, filters and reflective backing may be retained inside the cup-shaped recess of a dosimeter sled either by adhesives, compression fit or retaining rings that also retain the OSLM in contact with the converters. The retaining ring may be a 0.6 mm diameter wire that fully wraps around the interior diameter of the cup-shaped recess in the dosimeter sled. The retaining ring defines the optical readout area of the stimulation light illuminating the OSLM.

Although the converters and filters described below and shown in the drawings are flat in other embodiments, the converters may be parabolic to enhance the optical reflection of the luminescent emission into the optical engine but with added cost.

The depth of the recesses in the dosimeter sled and thickness of the filters and reflective backing layers are such that the OSLM in each recess in the dosimeter sled is at the same height and therefore the same distance from the exit of the light pipe of the optical engine.

Each OSL sensor may be individually calibrated as the reflection and light absorption properties of the HDPE and PTFE are slightly different. This also permits visual distinction of the OLS sensors needed for accurate assembly of the dosimeter.

In one embodiment, the present invention provides dosimeter sled with three OSL sensors: (1) a neutron-sensitive OSL sensor that senses gamma, x-ray and neutron radiation, (2) a reference sensor that senses only x-ray and gamma radiation and (3) a comparator OSL sensor for the reference sensor.

The neutron-sensitive OSL sensor includes an OSLM, a reflective backing made of a reflective energy compensating material, such as aluminum, and an outer filter made of an energy compensating material, such as copper. Placed between the reflective backing and the OSLM, is a converter material, such as high-density polyethylene, that converts neutrons into recoil protons that can be sensed by the neutron-sensitive OSL sensor. The converter material may be present as a thin coating on the OSLM or as a thin disc or a thin layer between the OSLM and reflective backing.

The reference OSL sensor for detecting only photons is identical to the neutron-sensitive OSL sensor, except that instead of the HDPE converter material being placed between the OSLM and reflective backing, a reference filter made from a reference filter material, such as polytetrafluoroethylene, is located between the OSLM and the reflective backing. The reference filter may be present as a thin coating of the reference filter material on the OSLM or as a thin disc or a thin layer between the OSLM and reflective backing. If the reference material is a thin disc, the reflective backing may be a coating of reflective material on the reference filter.

The comparator OSL sensor is identical to the reference OSL sensor, except that the comparator OSL sensor does not include the outer energy compensating filter of the reference OSL sensor.

In one embodiment, the neutron-sensitive OSL sensor, the reference OSL sensor, and the comparator OSL sensor may be mounted in a dosimeter sled that may be slid out of the radiation dosimeter to allow the three OSL sensors to be read using an OSL reader. The design of the dosimeter sled allows the three OSL sensors to be read from the same side, the exposed side of each OSL sensor where there is no filter covering the OSLM of the OSL sensor. Although in the embodiments shown below, the three OSL sensors are mounted in the dosimeter sled in the order: (1) neutron-sensitive OSL sensor, (2) reference OSL sensor, and (3) comparator OSL sensor, the three OSL sensors may be mounted in the dosimeter sled in any order.

In one embodiment of the present invention, the OSLM used in the OSL sensors is a specialized carbon-doped aluminum oxide ($Al_2O_3$:C) material manufactured by Landauer, Inc. (Glenwood, Ill.), and is similar to that marketed in dosimeters with trade names LUXEL+ and INLIGHT. The OSLM consists of specially formulated, proprietary, powderized $Al_2O_3$:C. For use in the OSL sensors of the present invention, the $Al_2O_3$:C material may be in the form a disc-shaped pellet.

Exposure of the $Al_2O_3$:C material in each of the three OSL sensors to ionizing radiation releases electrons that are trapped in defects in the material's crystal structure. The electrons are released from the traps when stimulated with 520±10 nm wavelength light (i.e. green). As they return to the ground state, 420±10 nm wavelength light (i.e. blue) is emitted. It should be noted that other light wavelengths could be employed, as could a pulsed stimulation system in reading the OSL sensors of the present invention.

The dosage of gamma ray and x-ray radiation received by the dosimeter and the individual who has been wearing the dosimeter may be determined from the emitted light from the second or reference OSL sensor and may be modified based on the results of reading the third comparator OSL sensor. The dosage of neutron radiation may be determined by subtracting the dosage value from reading the second OSL sensor from the dosage value from reading the first OSL sensor and multiplying the result by a calibration factor appropriate for the expected neutron energy spectrum.

In one embodiment of the present invention, the dosimeter sled may include an RFID tag. The RFID tag includes a radiofrequency (RF) antenna that allows the RFID tag to communicate with the RF antenna of an RFID tag reader to allow information/data to be read from the RFID tag by the RFID tag reader and to allow the RFID tag reader to store information on the RFID tag. In one embodiment of the present invention, the RFID tag includes a non-volatile data storage device, such as flash memory, that allows the RFID tag to store information about the radiation dosimeter in which a dosimeter sled of the present invention is slidably mounted and information about the wearer of the radiation dosimeter that enables the reading out of the radiation dosimeter by any reader without having to access a database to retrieve data needed to calculate the dose. The RFID tag may be read when the dosimeter sled is in a reading position for one of the OSL sensors of the dosimeter sled or at a separate reading position for the RFID tag.

The RFID tag may store the results of the last several readouts, thereby enabling the dose history experienced by the wearer to be retrieved. The RFID tag may carry identification, date and time data to establish a chain of custody regarding who was assigned the dosimeter and when certain actions were performed on the dosimeter. In one embodiment of the present invention, the RFID tag may carry the following information: identification information for the dosimeter model, dosimeter serial number and an identification number for the individual to whom the dosimeter is assigned, calibration data for each OSL sensor, date and time information needed to estimate the buildup of background radiation dose, the total radiation dose and the dose from gamma rays and the dose from neutrons, date and time information regarding the assignment of the dosimeter to an individual, date and time information when the dosimeter was readout, and reader quality control data depicting the operability of the OSL reader during the analysis of the OSL sensors of the dosimeter sled including the unique reader identification number.

The RFID tag of the present invention may be read and written to using an appropriate RFID antenna and deciphering code either by the OSL reader or by a stand-alone RFID tag reader connected to a PC or other data input device. When the dosimeter is returned to a laboratory from the field, the dose results may be separately read out to verify the field results and the recent history of the dosimeter results obtained in the field reviewed to establish an accredited radiation dose record for archiving.

In one embodiment of the present invention, the RFID tag enables the dosimeter to be analyzed in remote areas where there is no access to databases containing information needed for the correct analysis of the dosimeter. The RFID tag carries the history of the analysis of the dosimeter so that a dose reconstruction can be performed. The RFID tag has a limited range of readout to avoid detection of the dosimeter during covert operations.

In one embodiment, the OSL reader may communicate with a database separated from the OSL reader. The OSL reader may communicate with the separate database in a variety of ways such as: wireless communication, communicating via an optical fiber, communicating over a wire, communicating over the Internet, communicating over a phone line, etc.

In some embodiments of the present invention a dosimeter containing a dosimeter sled with one or more OSL sensors may be given to and worn by an individual before the dosimeter is assigned to the individual in the database. In such cases, the database may be updated with the name and other identification such as social security number, dog tag number, etc., for the individual to whom the dosimeter has been assigned at a later date. The database may even be updated the first time that the one or more OSL sensors of the dosimeter sled are read by an OSL reader.

Figure 2:
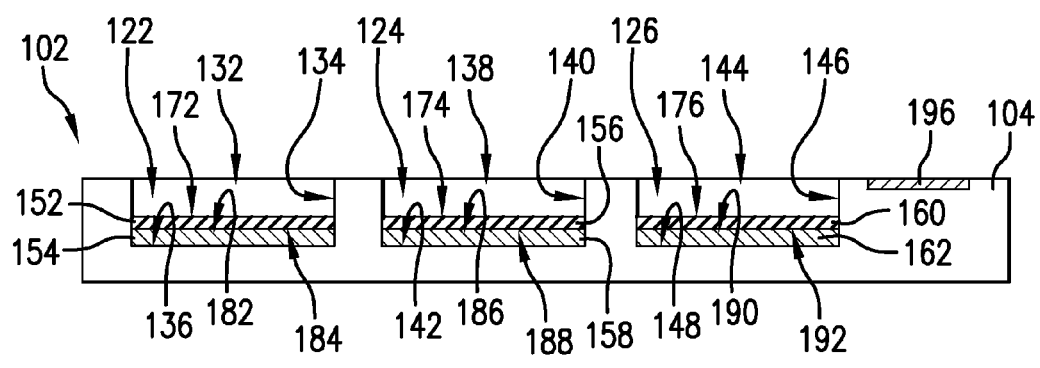
FIG. 2 is a cross-sectional view of the dosimeter sled of FIG. 1.

FIGS. 1 and 2 show a dosimeter sled 102 according to one embodiment of the present invention having a dosimeter sled body 104. OSL sensors 112, 114 and 116 are mounted in respective cylindrical cup-shaped recesses 122, 124 and 126. Recess 122 has an opening 132, a cylindrical side wall 134 and a base 136. Recess 124 has an opening 138, a cylindrical side wall 140 and a base 142. Recess 126 has an opening 144, a cylindrical side wall 146 and a base 148. Mounted in recess 122 is a disc-shaped OSLM 152 and disc-shaped reflective backing 154. Mounted in recess 124 is a disc-shaped OSLM 156 and disc-shaped reflective backing 158. Mounted in recess 126 is a disc-shaped OSLM 160 and disc-shaped reflective backing 162. OSLM 152, OSLM 156 and OSLM 160 have respective exposed sides 172, 174 and 176 that may be illuminated by stimulation light from an OSL reader (such as shown in FIG. 11).

Figure 11:
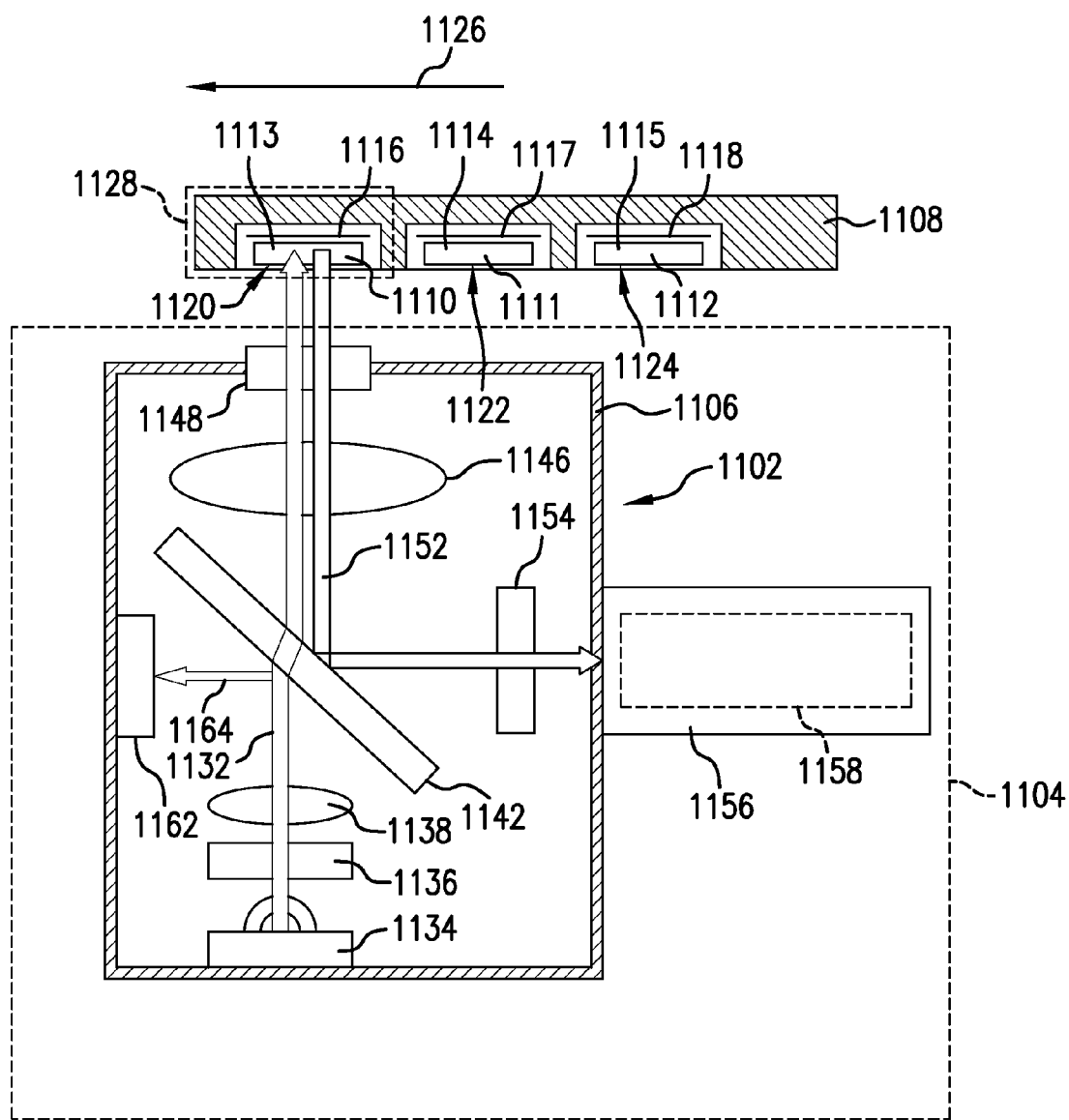
FIG. 11 is a drawing in schematic form of an optical system of an OSL reader.

Reflective backing 154 includes a reflective surface 182 that reflects stimulation light passing through OSLM 152 back into OSLM 152 stimulation light from an OSL reader (such as shown in FIG. 11) back into OSLM 152. Reflective backing 154 also reflects luminescent light emitted from OSLM 152 from a filtered side 184 of OSLM 152 back through OSLM 152 allowing the reflected luminescent light to be detected by an OSL reader (such as the OSL reader shown in FIG. 11). Reflective backing 158 includes a reflective surface 186 that reflects stimulation light passing through OSLM 156 back into OSLM 156 stimulation light from an OSL reader (such as shown in FIG. 11) back into OSLM 156. Reflective backing 158 also reflects luminescent light emitted from OSLM 156 from a filtered side 188 of OSLM 156 back through OSLM 156 allowing the reflected luminescent light to be detected by an OSL reader (such as the OSL reader shown in FIG. 11). Reflective backing 162 includes a reflective surface 190 that reflects stimulation light passing through OSLM 160 back into OSLM 160 stimulation light from an OSL reader (such as shown in FIG. 11) back into OSLM 160. Reflective backing 162 also reflects luminescent light emitted from OSLM 160 from a filtered side 192 of OSLM 160 back through OSLM 160 allowing the reflected luminescent light to be detected by an OSL reader (such as the OSL reader shown in FIG. 11). Dosimeter sled 102 includes an RFID tag 196 mounted in sled body 104.

Each of the reflective backings in the embodiment of the present invention shown in FIGS. 1 and 2 may be a disc-shaped piece of reflective material or a reflective coating coated on the base of the recess.

Figure 3:
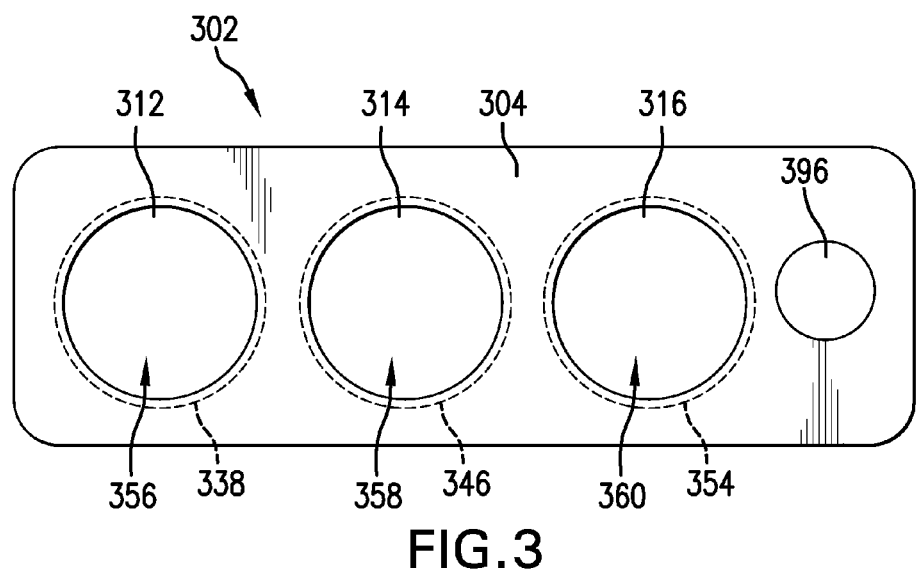
FIG. 3 is a schematic plan view of a dosimeter sled of the present invention having three OSL sensors.
Figure 4:
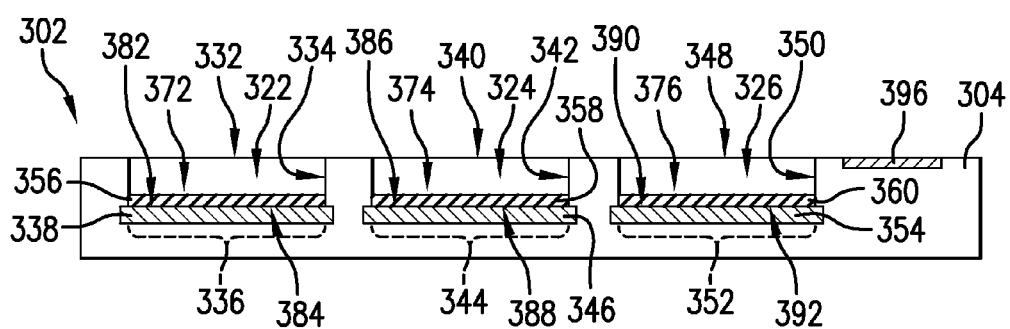
FIG. 4 is a cross-sectional view of the dosimeter sled of FIG. 3.

FIGS. 3 and 4 show a dosimeter sled 302 according to one embodiment of the present invention having a dosimeter sled body 304. OSL sensors 312, 314 and 316 are mounted in respective cylindrical cup-shaped recesses 322, 324 and 326. Recess 322 has an opening 332 and a cylindrical side wall 334. Recess 322 has a base 336 that is a portion of a disc-shaped reflective backing 338 mounted in sled body 304. Recess 324 has an opening 340 and a cylindrical side wall 342. Recess 324 has a base 344 that is a portion of a disc-shaped reflective backing 346 mounted in sled body 304. Recess 326 has an opening 348 and a cylindrical side wall 350. Recess 326 has a base 352 that is part of a reflective backing 354. Mounted in recess 322 is a disc-shaped OSLM 356. Mounted in recess 324 is a disc-shaped OSLM 358 and disc-shaped reflective backing 346. Mounted in recess 326 is a disc-shaped OSLM 360. OSLM 356, OSLM 358 and OSLM 360 have respective exposed sides 372, 374 and 376 that may be illuminated by stimulation light from an OSL reader (such as shown in FIG. 11).

Reflective backing 338 includes a reflective surface 382 that reflects stimulation light passing through OSLM 356 back into OSLM 356 stimulation light from an OSL reader (such as shown in FIG. 11) back into OSLM 356. Reflective backing 338 also reflects luminescent light emitted from OSLM 356 from a filtered side 384 of OSLM 356 back through OSLM 356 allowing the reflected luminescent light to be detected by an OSL reader (such as the OSL reader shown in FIG. 11). Reflective backing 346 includes a reflective surface 386 that reflects stimulation light passing through OSLM 358 back into OSLM 358 stimulation light from an OSL reader (such as shown in FIG. 11) back into OSLM 358. Reflective backing 346 also reflects luminescent light emitted from OSLM 358 from a filtered side 388 of OSLM back through OSLM 358 allowing the reflected luminescent light to be detected by an OSL reader (such as the OSL reader shown in FIG. 11). Reflective backing 354 includes a reflective surface 390 that reflects stimulation light passing through OSLM 360 back into OSLM 360 stimulation light from an OSL reader (such as shown in FIG. 31) back into OSLM 360. Reflective backing 354 also reflects luminescent light emitted from OSLM 360 from a filtered side 392 back through OSLM 360 allowing the reflected luminescent light to be detected by an OSL reader (such as the OSL reader shown in FIG. 11). Dosimeter sled 302 includes an RFID tag 396 mounted in sled body 304.

FIGS. 3 and 4 show a dosimeter sled 302 according to one embodiment of the present invention having a dosimeter sled body 304. OSL sensors 312, 314 and 316 are mounted in respective cylindrical cup-shaped recesses 322, 324 and 326. Recess 322 has an opening 332 and a cylindrical side wall 334. Recess 322 has a base 336 that is a portion of a disc-shaped reflective backing 338 mounted in sled body 304. Recess 324 has an opening 340 and a cylindrical side wall 342. Recess 324 has a base 344 that is a portion of a disc-shaped reflective backing 346 mounted in sled body 304. Recess 326 has an opening 348 and a cylindrical side wall 350. Recess 326 has a base 352 that is part of a disc-shaped reflective backing 354 mounted in sled body 304. Mounted in recess 322 is a disc-shaped OSLM 356. Mounted in recess 324 is a disc-shaped OSLM 358. Mounted in recess 326 is a disc-shaped OSLM 360. OSLM 356, OSLM 358 and OSLM 360 have respective exposed sides 372, 374 and 376 that may be illuminated by stimulation light from an OSL reader (such as shown in FIG. 11).

Reflective backing 338 includes a reflective surface 382 that reflects stimulation light passing through OSLM 356 back into OSLM 356 stimulation light from an OSL reader (such as shown in FIG. 11) back into OSLM 356. Reflective backing 338 also reflects luminescent light emitted from OSLM 356 from a filtered side 384 back through OSLM 356 allowing the reflected luminescent light to be detected by an OSL reader (such as the OSL reader shown in FIG. 11). Reflective backing 346 includes a reflective surface 386 that reflects stimulation light passing through OSLM 358 back into OSLM 358 stimulation light from an OSL reader (such as shown in FIG. 11) back into OSLM 358. Reflective backing 346 also reflects luminescent light emitted from OSLM 358 from a filtered side 388 back through OSLM 358 allowing the reflected luminescent light to be detected by an OSL reader (such as the OSL reader shown in FIG. 11). Reflective backing 354 includes a reflective surface 390 that reflects stimulation light passing through OSLM 560 back into OSLM 360 stimulation light from an OSL reader (such as shown in FIG. 11) back into OSLM 360. Reflective backing 354 also reflects luminescent light emitted from OSLM 360 from a filtered side 392 back through OSLM 360 allowing the reflected luminescent light to be detected by an OSL reader (such as the OSL reader shown in FIG. 11). Dosimeter sled 302 includes an RFID tag 396 mounted in sled body 304.

Figure 5:
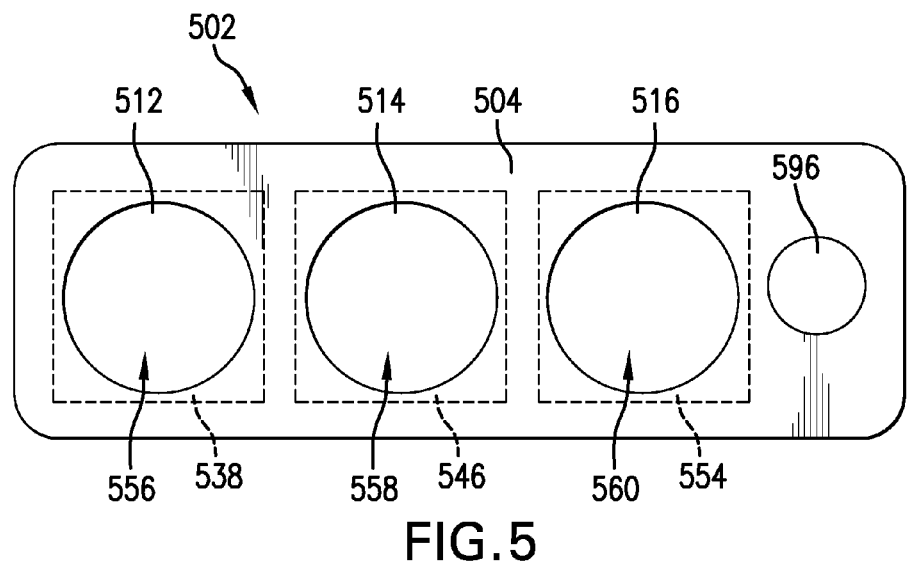
FIG. 5 is a schematic plan view of a dosimeter sled of the present invention having three OSL sensors.
Figure 6:
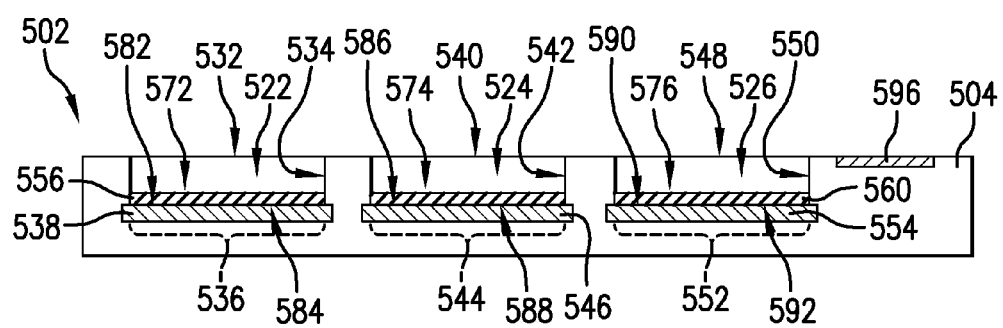
FIG. 6 is a cross-sectional view of the dosimeter sled of FIG. 5.

FIGS. 5 and 6 show a dosimeter sled 502 according to one embodiment of the present invention having a dosimeter sled body 504. OSL sensors 512, 514 and 516 are mounted in respective cylindrical cup-shaped recesses 522, 524 and 526. Recess 522 has an opening 532 and a cylindrical side wall 534. Recess 522 has a base 536 that is a portion of a square-shaped reflective backing 538 mounted in sled body 504. Recess 524 has an opening 540 and a cylindrical side wall 542. Recess 524 has a base 544 that is a portion of a square-shaped reflective backing 546 mounted in sled body 504.

Recess 526 has an opening 548 and a cylindrical side wall 550. Recess 526 has a base 552 that is part of a square-shaped reflective backing 554 mounted in sled body 304. Mounted in recess 522 is a disc-shaped OSLM 556. Mounted in recess 524 is a disc-shaped OSLM 558. Mounted in recess 526 is a disc-shaped OSLM 560. OSLM 556, OSLM 558 and OSLM 560 have respective exposed sides 572, 574 and 576 that may be illuminated by stimulation light from an OSL reader (such as shown in FIG. 11).

Reflective backing 538 includes a reflective surface 582 that reflects stimulation light passing through OSLM 556 back into OSLM 556 stimulation light from an OSL reader (such as shown in FIG. 11) back into OSLM 556. Reflective backing 538 also reflects luminescent light emitted from OSLM 556 from a filtered side 584 back through OSLM 556 allowing the reflected luminescent light to be detected by an OSL reader (such as the OSL reader shown in FIG. 11). Reflective backing 546 includes a reflective surface 586 that reflects stimulation light passing through OSLM 558 back into OSLM 558 stimulation light from an OSL reader (such as shown in FIG. 11) back into OSLM 558. Reflective backing 546 also reflects luminescent light emitted from OSLM 558 from a filtered side 588 back through OSLM 558 allowing the reflected luminescent light to be detected by an OSL reader (such as the OSL reader shown in FIG. 11). Reflective backing 554 includes a reflective surface 590 that reflects stimulation light passing through OSLM 560 back into OSLM 560 stimulation light from an OSL reader (such as shown in FIG. 51) back into OSLM 560. Reflective backing 554 also reflects luminescent light emitted from OSLM 560 from a filtered side 592 back through OSLM 560 allowing the reflected luminescent light to be detected by an OSL reader (such as the OSL reader shown in FIG. 11). Dosimeter sled 502 includes an RFID tag 596 mounted in sled body 504.

Although disc-shaped and square-shaped reflective backings are shown in FIGS. 3, 4, 5 and 6, other shapes of reflective backings may be used in embodiments of the present invention.

Figure 7:
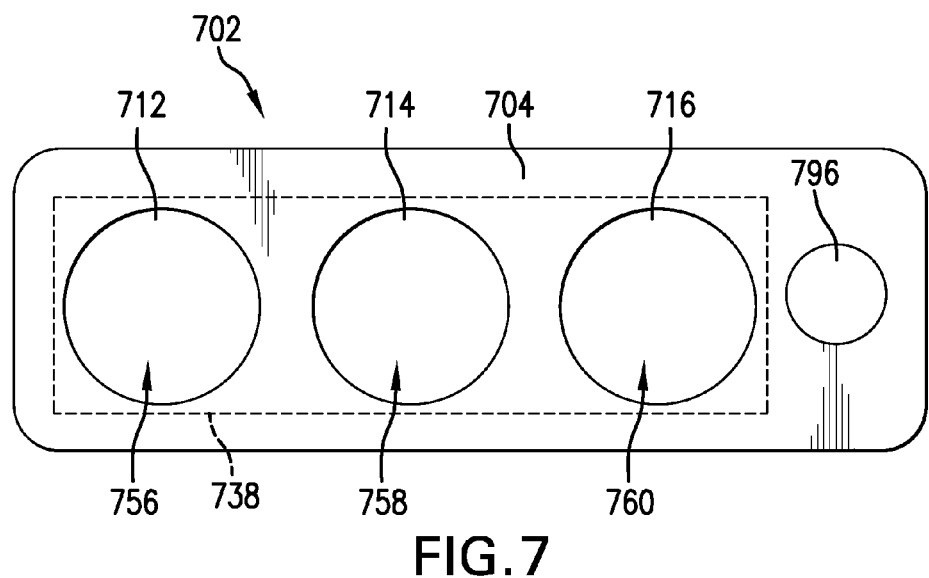
FIG. 7 is a schematic plan view of a dosimeter sled of the present invention having three OSL sensors.
Figure 8:
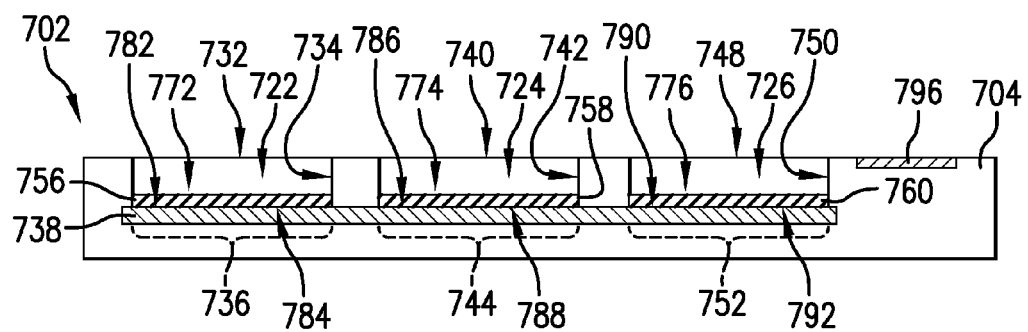
FIG. 8 is a cross-sectional view of the dosimeter sled of FIG. 7.

FIGS. 7 and 8 show a dosimeter sled 702 according to one embodiment of the present invention having a dosimeter sled body 704 employing a single reflective backing for multiple OSL sensors. OSL sensors 712, 714 and 716 are mounted in respective cylindrical cup-shaped recesses 722, 724 and 726. Recess 722 has an opening 732 and a cylindrical side wall 734. Recess 722 has a base 736 that is a portion of a rectangular-shaped reflective backing 738 mounted in sled body 704. Recess 724 has an opening 740 and a cylindrical side wall 742. Recess 724 has a base 744 that is a portion of reflective backing 738. Recess 726 has an opening 748 and a cylindrical side wall 750. Recess 726 has a base 752 that is part of reflective backing 738. Mounted in recess 722 is a disc-shaped OSLM 756. Mounted in recess 724 is a disc-shaped OSLM 758. Mounted in recess 726 is a disc-shaped OSLM 760. OSLM 756, OSLM 758 and OSLM 760 have respective exposed sides 772, 774 and 776 that may be illuminated by stimulation light from an OSL reader (such as shown in FIG. 11).

Reflective backing 738 includes a reflective surface 782 that reflects stimulation light passing through OSLM 756 back into OSLM 756 stimulation light from an OSL reader (such as shown in FIG. 11) back into OSLM 756. Reflective backing 738 also reflects luminescent light emitted from OSLM 756 from a filtered side 784 back through OSLM 756 allowing the reflected luminescent light to be detected by an OSL reader (such as the OSL reader shown in FIG. 11). Reflective backing 738 includes a reflective surface 786 that reflects stimulation light passing through OSLM 758 back into OSLM 758 stimulation light from an OSL reader (such as shown in FIG. 11) back into OSLM 758. Reflective backing 738 also reflects luminescent light emitted from OSLM 758 from a filtered side 788 back through OSLM 758 allowing the reflected luminescent light to be detected by an OSL reader (such as the OSL reader shown in FIG. 11). Reflective backing 738 includes a reflective surface 790 that reflects stimulation light passing through OSLM 760 back into OSLM 760 stimulation light from an OSL reader (such as shown in FIG. 71) back into OSLM 760. Reflective backing 738 also reflects luminescent light emitted from OSLM 760 from a filtered side 792 back through OSLM 760 allowing the reflected luminescent light to be detected by an OSL reader (such as the OSL reader shown in FIG. 11). Dosimeter sled 702 includes an RFID tag 796 mounted in sled body 704.

Figure 9:
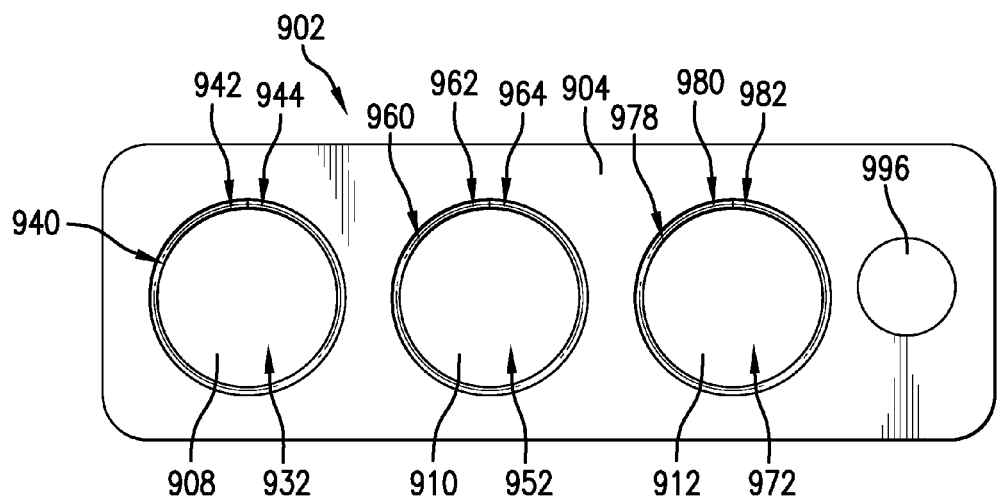
FIG. 9 is a schematic plan view of a dosimeter sled of the present invention having three OSL sensors.
Figure 10:
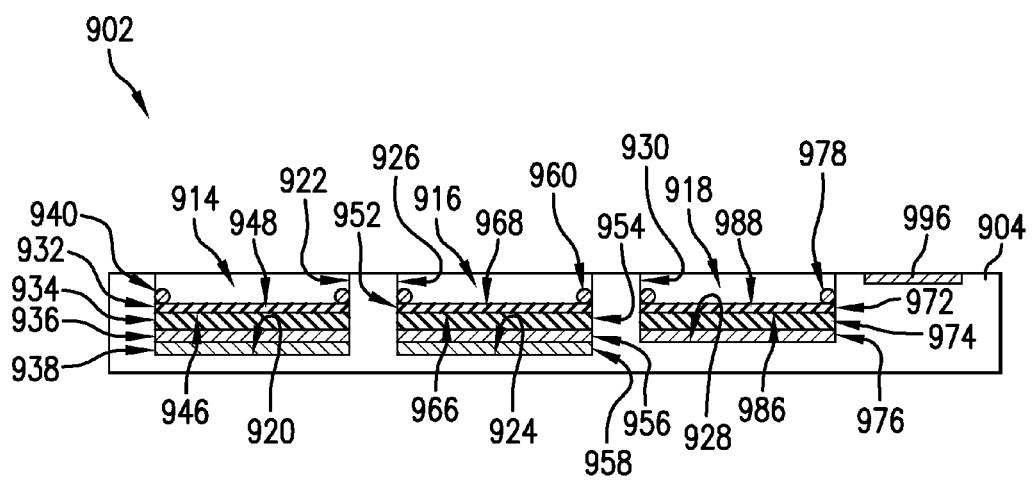
FIG. 10 is a cross-sectional view of the dosimeter sled of FIG. 9.

FIGS. 9 and 10 show a dosimeter sled 902 according to one embodiment of the present invention having a dosimeter sled body 904. A neutron-sensitive OSL sensor 908, a reference OSL sensor 910 and a comparator OSL sensor 912 are mounted in respective cylindrical cup-shaped recesses 914, 916 and 918 of dosimeter body 904. Recess 914 includes a disc-shaped base 920 and a cylindrical wall 922. Recess 916 includes a disc-shaped base 924 and a cylindrical wall 926. Recess 918 includes a disc-shaped base 928 and a cylindrical wall 930. Neutron-sensitive OSL sensor 908 includes a disc-shaped OSLM 932, a converter material disc 934, a reflective backing 936 and a disc-shaped outer filter 938. Converter material disc 934 is located between OSLM 932 and reflective backing 936.

Reflective backing 936 may be a disc-shaped piece of reflective material, a reflective coating coated on converter material disc 934 or a reflective coating coated on outer filter 938. In one embodiment of the present invention where reflective backing 936 is a separate disc, OSLM 932, converter material disc 934, reflective backing 936 and outer filter 938 are held in place in recess 914 by a retaining ring 940. In one embodiment of the present invention in which reflective backing 936 is a coating on converter material disc 934, OSLM 932, converter material disc 934 (including reflective backing 936 as a coating) and outer filter 938 are held in place in recess 914 by retaining ring 940. In one embodiment of the present invention in which reflective backing 936 is a coating on outer filter 938, OSLM 932, converter material disc 934 and outer filter 938 (including reflective backing 936 as a coating) are held in place in recess 914 by a retaining ring 940.

Retaining ring 940 is a spring-type retaining ring and is held in place in recess 914 by compression by cylindrical wall 922. Compressed by cylindrical wall 922, ends 942 and 944 of retaining ring 940 abut each other. OSLM 932 has a filtered side 946, the side of OSLM 932 filtered by converter material disc 934, reflective backing 936 and outer filter 938. Neutron-sensitive OSL sensor 916 has an exposed side 948 that allows the combined dosage of x-ray, gamma and neutron radiation to which OSLM 932 has been exposed to be read by an OSL reader. Retaining ring 940 is mounted on exposed side 948 of OSLM 932.

Reference OSL sensor 910 includes a disc-shaped OSLM 952, a disc-shaped reference filter 954, a reflective backing 956 and a disc-shaped outer filter 958. Reference filter 954 is located between OSLM 952 and reflective backing 956. Reflective backing 956 may be a disc-shaped piece of reflective material, a reflective coating coated on reference filter 954 or a reflective coating coated on outer filter 958. In one embodiment of the present invention where reflective backing 956 is a separate disc, OSLM 952, reference filter 954, reflective backing 956 and outer filter 958 are held in place in recess 916 by a retaining ring 960. In one embodiment of the present invention in which reflective backing 956 is a coating on reference filter 954, OSLM 952, reference filter 954 (including reflective backing 956 as a coating) and outer filter 958 are held in place in recess 916 by retaining ring 960. In one embodiment of the present invention in which reflective backing 956 is a coating on outer filter 958, OSLM 952, reference filter 954 and outer filter 958 (including reflective backing 956 as a coating) are held in place in recess 916 by retaining ring 960.

Retaining ring 960 is a spring-type retaining ring and is held in place in recess 916 by compression by cylindrical wall 926. Compressed by cylindrical wall 926, ends 962 and 964 of retaining ring 960 abut each other. OSLM 952 has a filtered side 966, the side of OSLM 952 filtered by reference filter 954, reflective backing 956 and outer filter 958. Reference OSL sensor 910 has an exposed side 968 that allows the combined dosage of x-ray and gamma radiation to which OSLM 952 has been exposed to be read by an OSL reader. Retaining ring 960 is mounted on exposed side 968 of OSLM 952.

Comparator OSL sensor 912 includes a disc-shaped OSLM 972, a disc-shaped reference filter 974 and a reflective backing 976. Reference filter 974 is located between OSLM 972 and reflective backing 976. Reflective backing 976 may be a disc-shaped piece of reflective material or a reflective coating coated on reference filter 974. In one embodiment of the present invention, OSLM 972 and reference filter 974 (including reflective backing 976 as a coating) are held in place in recess 918 by retaining ring 978. In one embodiment of the present invention, OSLM 972, reference filter 974 and reflective backing 976 are held in place in recess 918 by a retaining ring 978.

Retaining ring 978 is a spring-type retaining ring and is held in place in recess 918 by compression by cylindrical wall 930. Compressed by cylindrical wall 930, ends 980 and 982 of retaining ring 978 abut each other. OSLM 972 has a filtered side 986, the side of OSLM 972 filtered by reference filter 974 and reflective backing 976. Comparator OSL sensor 912 has an exposed side 988, which allows the combined dosage of x-ray and gamma radiation to which OSLM 972 has been exposed to be read by an OSL reader. Retaining ring 978 is mounted on exposed side 988 of OSLM 972. Dosimeter sled 902 includes an RFID tag 996 mounted in dosimeter body 904.

Neutron-sensitive OSL sensor 908 is identical to reference OSL sensor 910, except for the substitution of reference filter 954 of reference OSL sensor 910 for converter material disc 934 in neutron-sensitive OSL sensor 908. Comparator OSL sensor 912 is identical to reference OSL sensor 910, except reflective backing 976 is not mounted in an outer filter. In comparator OSL sensor 912, reflective backing 976 functions as an outer filter.

In the dosimeter sled of FIGS. 9 and 10, the OSLM of one of the OSL sensors has a converter material coated on the filtered side of the OSLM allowing the OSLM to function as an OSL sensor that senses gamma radiation and neutron radiation. The OSLM of a second OSL sensor has a filter reference material coated on the filtered side of the OSL that allows the OSLM to function as an OSL sensor for gamma radiation.

The OSLM of each of the OSL sensors shown in FIGS. 1, 2, 3, 4, 5, 6, 7, 8, 9 and 10 may be mounted in the recess of the dosimeter sled by any of a variety of ways including a retaining ring held in the recess by compression, crimping or melting the edges of the recess, etc.

FIG. 11 shows an optical engine 1102 of an OSL reader 1104 according to one embodiment of the present invention. Optical engine 1102 includes an optical engine frame 1106 on which and in which various components of optical engine 1102 are mounted. In FIG. 11, optical engine 1102 is shown being used to read a dosimeter sled 1108 including three OSL sensors, i.e., OSL sensors 1110, 1111 and 1112. OSL sensors 1110, 1111 and 1112 include respective OSLM discs 1113, 1114 and 1115 and respective reflective backings 1116, 1117 and 1118. OSLM discs 1113, 1114 and 1115 have respective exposed sides 1120, 1122 and 1124. To allow each OSL sensor of dosimeter sled 1108 to be read by OSL reader 1104, dosimeter sled 1108 is moved as shown by arrow 1126 to a reading position 1128 in OSL reader 1104. In FIG. 11, OSL sensor 1110 is in a reading position 1128, shown as a dashed box. Green stimulation light 1132 from an LED 1134 is transmitted through a long-wavelength-pass filter 1136 and directed on a collimation lens 1138. Long-wavelength-pass filter 1136 filters out blue tail of green stimulation light 1132. In one embodiment, long-wavelength-pass filter 1136 is a yellow long-wavelength-pass filter that passes green light and rejects, absorbs and/or blocks blue light. Collimation lens 1138 is positioned so that collimation lens 1138 collects and collimates green stimulation light 1132. After being collimated by collimation lens 1138, green stimulation light 1132 travels through a dichroic mirror 1142. After passing through dichroic mirror 1142, green stimulation light 1132 is further focused by a collection lens 1146 and is directed through a window 1148 and towards the OSL sensor that is currently in a reading position 1128. In FIG. 11, OSL sensor 1110 is in reading position 1128. When the OSL sensor at reading position 1128 is exposed to green stimulation light 1132, blue luminescent light 1152 is emitted from the OSL sensor. Blue luminescent light 1152 is transmitted through window 1148 and collected by collection lens 1146. Blue luminescent light 1152 is then reflected by dichroic mirror 1142 at a 90 degree angle through a blue band-pass filter 1154. Blue band-pass filter 1154 filters out non-blue light from blue luminescent light 1152, i.e., blue band-pass filter 1154 is a band-pass blue band-pass filter that passes only blue light and rejects well the green stimulation light. After passing through blue band-pass filter 1154, blue luminescent light 1152 is detected by photodetector 1156 that contains photomultiplier tube (PMT) 1158. PMT 1158, operating in a photon counting mode, quantifies the luminescence created in the OSL sensor at reading position 1128, based on the detected blue luminescent light 1152. A photodiode 1162 is located directly opposite photodetector 1156. A portion 1164 of green stimulation light 1132 is reflected by dichroic mirror 1142 and is detected by photodiode 1162, thereby allowing the intensity of green stimulation light 1132 to be measured.

Although for simplicity of illustration in FIG. 11 the stimulation light and luminescent light are shown as being in parallel, the stimulation light and luminescent light are actually in alignment and both the stimulation light and luminescent light pass through the center of the window and collection lens of the OSL reader. Also, although the stimulation light is shown only covering a portion of the OSLM disc of the OSL sensor being read, the stimulation light may illuminate all or a portion of the exposed side of the OSLM disc. In addition, although the luminescent light is shown being emitted by portion of the OSLM disc of the OSL sensor being read, the luminescent light may be emitted from all or portion of the exposed side of the OSLM disc.

The dichroic mirror in FIG. 11 is positioned at 45 degrees with respect to both the green stimulation light emitted from the LED and the blue luminescent light emitted from the OSL sensor.

As can be seen in the description above, the dichroic mirror in FIG. 11 is designed to transmit green stimulation light and reflect blue luminescence light.

The output window of the optical engine protects the inside optical components of optical engine from dust and water condensation that might degrade the performance of the optical engine.

The dosimeter sled of the present invention may be made a durable material such as plastic. In one embodiment, the dosimeter sled may be made of polyoxymethylene (POM) sold under the trade name Delrin® by Dupont. However, in other embodiments, the dosimeter sled may be made of polycarbonate, polyethylene, styrene or other durable plastic materials.

All documents, patents, journal articles and other materials cited in the present application are incorporated herein by reference.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A device comprising:
  a dosimeter sled comprising one or more optically stimulated luminescence (OSL) sensors, each OSL sensor comprising:
    an optically stimulated luminescent material (OSLM) mounted in a recess of the dosimeter sled, and
    a flat reflective backing comprising a metal positioned in the recess,
  wherein the recess is a cylindrical cup-shaped recess having a base, and
  wherein the entire reflective backing is disposed between the OSLM and the base of the recess.

2. The device of claim 1, wherein the reflective backing is a disc-shaped piece of reflective material.

3. The device of claim 1, wherein the reflective backing is a reflective coating on the base of the recess.

4. The device of claim 1, wherein the reflective backing comprises an energy compensating material.

5. The device of claim 1, wherein the OSL sensor comprises a filter positioned in the recess between the reflective backing and the base of the recess, and wherein the filter is disc-shaped.

6. The device of claim 1, wherein the reflective backing comprises aluminum.

7. The device of claim 1, wherein the OSL sensor comprises one or more filters located between the OSLM and the reflective backing.

8. The device of claim 7, wherein the reflective backing is a coating on one of the one or more filters.

9. The device of claim 6, wherein the OSL sensor comprises a converter material disc located between the OSLM and the reflective backing.

10. The device of claim 9, wherein the converter material disc comprises high-density polyethylene and wherein there is a conformal disc comprising polyethylene located between the OSLM and the converter material disc.

11. The device of claim 1, wherein the OSLM for the OSL sensor comprises an $Al_2O_3$:C material.

12. The device of claim 1, wherein the OSL sensor comprises one or more filters located between the OSLM and the reflective backing; and wherein the OSL sensor comprises a reference filter located between the OSLM and the reflective backing.

13. The device of claim 12, wherein the reference filter comprises polytetrafluoroethylene.

14. The device of claim 1, wherein the OSL sensor comprises: one or more filters located between the OSLM and reflective backing, and a spring-type retaining ring mounted on an exposed side of the OSLM and compressed by a cylindrical wall of the recess, and wherein the retaining ring retains the OSLM, the one or more filters and the reflective backing in the recess.

15. The device of claim 1, wherein dosimeter sled comprises two or more OSL sensors.

16. The device of claim 15, wherein at least one of the two or more OSL sensors is a comparator OSL sensor.

17. The device of claim 15, wherein at least one of the two or more OSL sensors is a reference OSL sensor.

18. A device comprising:
  a dosimeter sled comprising one or more optically stimulated luminescence (OSL) sensors, each OSL sensor comprising:
    an optically stimulated luminescent material (OSLM) mounted in a recess of the dosimeter sled, and
    a flat reflective backing comprising a metal mounted in the dosimeter sled,
  wherein the recess is a cylindrical cup-shaped recess having a disc-shaped base,
  wherein the flat reflective backing comprises an area within an edge boundary of the disc-shaped base,
  wherein another area of the reflective backing extends outwardly across the edge boundary of the disc-shaped base of the recess.

19. The device of claim 18, wherein the dosimeter sled comprises two or more OSL sensors.

20. A device comprising:
  a dosimeter sled comprising:
  one or more optically stimulated luminescence (OSL) sensors, each OSL sensor comprising:
    an optically stimulated luminescent material (OSLM) mounted in two or more recesses of the dosimeter sled, and
    a flat reflective backing comprising a metal,
  wherein the two or more recesses comprise respective cylindrical cup-shaped recesses each having a respective disc-shaped base,
  wherein the flat reflective backing traverses two or more areas within two or more edge boundaries of the respective disc-shaped bases of the two or more recesses.

21. The device of claim 20, wherein another area of the reflective backing extends outwardly across the two or more edge boundaries of the respective disc-shaped bases of the two or more recesses.

* * * * *